Patented Oct. 19, 1943

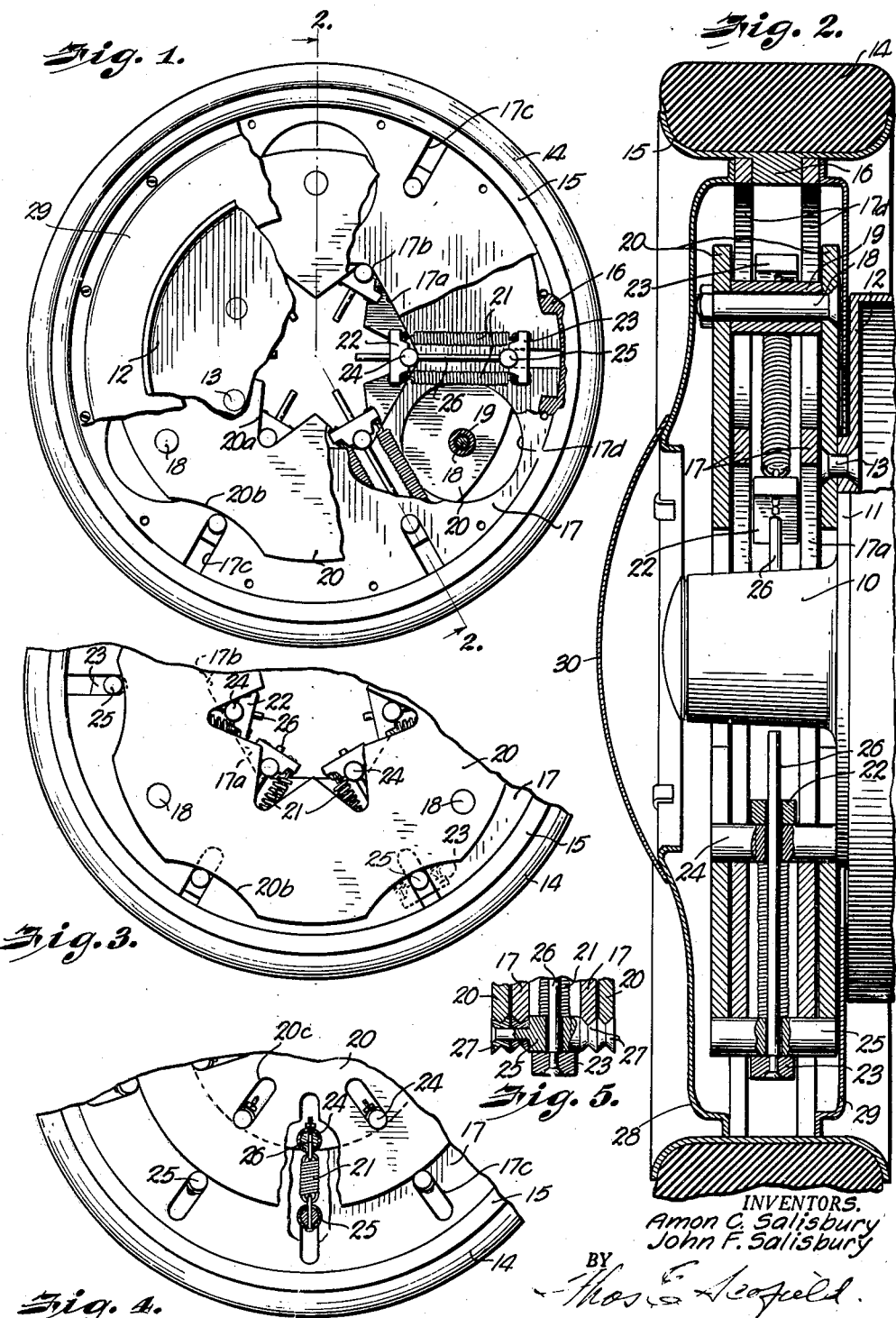

2,332,115

UNITED STATES PATENT OFFICE 2,332,115

SPRING CUSHIONED WHEEL

Amon C. Salisbury and John F. Salisbury, Independence, Mo.

Application July 20, 1942, Serial No. 451,566

6 Claims. (Cl. 152—110)

Our invention relates to improvements in spring cushioned wheels and refers more particularly to a wheel construction adaptable for use on vehicles of any nature where cushioning of road shocks is an advantage, and one in which vertical movement of the vehicle caused by irregularities of the terrain or road over which the vehicle is passing is transmitted simultaneously and the shock uniformly distributed over the entire system of springs or spring assemblies of the wheels receiving the shock.

Thus, the shock and stress put upon the wheels by such irregularities is absorbed evenly throughout the spring system of the wheels instead of being imposed only upon the springs substantially in vertical alignment with the force of the shock as is usual in spring cushioned wheel construction.

The construction has other advantages including simplicity of design, ruggedness and the fact that springs of relatively lower stress or tension may be employed, increased flexibility and improved riding qualities are attained.

In the accompanying drawing which forms a part of the instant specification and are to be read in conjunction therewith and in which like reference numerals are used to indicate like parts in the various views, Fig. 1 is a side, broken-away view of the mechanism, Fig. 2 is an enlarged cross sectional view taken along the line 2—2 in Fig. 1, in the direction of the arrows, Fig. 3 is a partial side view of the mechanism showing the manner in which the spring assembly operates, Fig. 4 is a partial view of a modified construction, and Fig. 5 is a detailed view showing a modified type of construction of the cross pin bearings.

The wheel upon which the spring cushioning construction is mounted may be of any suitable type. As here shown and referring particularly to Fig. 2, the wheel is an automobile wheel, having a hub 10 to which is fixedly attached a hub plate 11. To the hub plate is fastened a brake drum 12 by means of rivets 13. A hard rubber tire 14 is mounted upon a rim 15 which is carried by a felly 16. Separated by the width of the felly and fixedly attached to the felly and rim are two rim plates 17. These rim plates have central apertures surrounding the hub which apertures have the form of a multi-sided figure; in the preferred form of construction shown in Figs. 1-3 inclusive they are hexagonal in shape and are designated by the numeral 17a. The shape of these holes or apertures is not limited to a hexagonal figure, it being necessary only to have the number of corners which they have correspond to the number of slots in the rim plates near the rim in order to accommodate the end cross pins of the spring assemblies as will be later explained. The corners of these hexagonal apertures are for convenience designated as 17b. In the rim plates adjacent the rim of the wheel are a plurality of slots or apertures 17c extending radially a short distance from the rim in alignment with and toward the corners 17b of the central hexagonal apertures 17a of the rim plates. In addition to these central apertures 17a and slots 17b, there are circular apertures 17d in the rim plates, one hundred and twenty degrees apart in the center of which are positioned spacer bolts 18, surrounded by sleeves 19 which maintain the tension plates 20 in position and transmit the stress of starting and stopping to the wheel assembly. The circular holes 17d permit a limited circumferential movement of the spacer bolts 18 around the hub of the wheel in stopping and starting and radially of the wheel during the actuation of the springs in cushioning road shock.

The tension plates 20 are also two in number, spaced apart as described by bolts and sleeves 18 and 19 and are rigidly attached to the wheel hub by rivets or other suitable fastening shown at 13. The tension plates, as shown in the preferred form in Figs. 1, 2, and 3 have star-shaped central apertures 20a, the number of points of the stars corresponding to the number of corners or sides in the central apertures 17a of the rim plates. Six-sided stars 20a are shown in the drawing to correspond to the hexagonal apertures 17a of the rim plates. The outer edges of the tension plates have circular perimeters, scalloped with inverted curves 20b in radial alignment with the ends of the points of the star-shaped central apertures 20a.

The spring assemblies consist of tension springs 21 positioned between inner anchors 22 and outer anchors 23. The inner spring anchors 22 are mounted upon transverse or cross pins 24 and the outer spring anchors 23 are mounted on cross pins 25. These cross pins lie parallel with the axis of the wheel and at right angles to the axis of the springs. Longitudinally of the springs and extending through holes in the cross pins are guide rods 26, held in position by riveting their reduced outer ends to the outer spring anchors.

The function of these guide rods is to hold the spring assemblies, including the springs and spring anchors in radial alignment, thereby preventing distortion and failure or faulty operation of the springs.

The transverse or cross pins may be fitted with roller bearings having V-shaped peripheries as shown at 27 in Fig. 5. Bearings of this kind on the cross pins serve not only to reduce friction but also to better hold the rim and tension plates in spaced apart relationship, thereby eliminating frictional contact therebetween.

The cross pins 25 of the outer spring anchors slide in the slots 17c in the rim plates, which slots extend radially from the rims toward the central hexagonal apertures and ride upon the inverted curves 20b of the tension plates.

The cross pins 24 of the inner spring anchors are positioned in the corners 17b of the multi-sided or hexagonal apertures 17a in the rim plates 17 and in the rounded points of the star-shaped apertures 20a of the tension plates 20.

In the modified form of construction shown in Fig. 4, the rim plates and tension plates are similarly associated with respect to the wheel construction as shown in Figs. 1, 2, and 3, the principal differences being in the shape of the apertures in the respective plates, for reception of the cross pins and the type of spring assembly used. In this modified form, the outer slots 17c in the rim plates extending from the rim inwardly have the same shape as the slots in the preferred form. The central apertures in the rim plates, in the modified construction, are circular in form, instead of multi-sided figures. Likewise, the tension plates 20 are circular offering smooth edges and continuous curves as the riding surfaces for the outer cross pins instead of the scalloped depressions 20b on the edges of the tension plates of the preferred form. The central apertures in the tension plates are shown as individual slots 20c in place of the star-shaped apertures 20a shown in the preferred form. The spring assembly in the modified form is shown as springs 21 positioned between inner cross pins 24 and outer cross pins 25. End connections 26 are used to attach the ends of the spring 21 to the cross pins.

Inner cross pins 24 ride upon the circular edges of the central apertures of the rim plates and also slide in the slots 20c of the tension plates. Outer cross pins 25 slide in slots 17c of the rim plates and ride upon the circular rims or outer edges of the tension plates 20.

It will be noted that tension springs only are used throughout, resulting in greater flexibility, reduction in friction and increased cushioning action.

Although but three spacer pins have been shown between the tension plates at intervals of one hundred and twenty degrees around the wheel, the number may be increased to obtain greater rigidity. Holes in the rim must be provided sufficiently large to permit radial and circumferential movement of the pins.

Furthermore, the number and strength of the tension springs used in the spring assemblies is dependent upon the weight of the load to be carried or the weight to be supported by the spring cushioned wheels. It is contemplated that an adjustment as shown diagrammatically in the modified construction in Fig. 4 may be used to vary the tension on the springs.

The spring cushioning mechanism of the wheel is enclosed at the front and rear by annular enclosure rings 28 and 29. The central hole in the front enclosure is closed by a hub cap 30 of conventional design.

In operation, the functioning of the preferred and modified form is generally the same and is as follows: As the wheel passes over a depression in the terrain, the weight of the vehicle will impose a vertical force downwardly upon the wheel. This force is transmitted from the axle to the hub, thence to the tension plates. The rims of the tension plates, acting against the outer cross pins 25 of the spring assemblies below the hub puts additional stress upon the spring assemblies at this location.

Simultaneously, the inner cross pins 24 at the top of the wheel or above the hub riding on the points of the star-shaped apertures of the tension plates will move downwardly putting increased stress on the springs at the top of the wheel.

At the same time, the inner and outer cross pins of spring assemblies located between the top and bottom positions will be affected by the rim and tension plate surfaces against which they ride and are engaged to put corresponding stress on the springs in these locations.

Conversely, when the wheel rides over a bump in the terrain or road the outer cross pins at the bottom of the wheel will again be pushed downwardly by the action of the lower edges of the tension plates and increased stress put on the springs below the hub. The springs above the hub will likewise be stressed by action of the points or surfaces of the star-shaped apertures in the tension plates pulling downwardly upon the inner cross pins and expanding the springs whose outer ends are anchored in the rim slots of rim plates at the top of the wheel. The intermediate spring assemblies between the top and bottom will operate in the same manner to that when a depression is encountered.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, we claim:

1. A spring cushioned wheel comprising hub, rim, and tire members, rim plates fastened to the rim and having apertures centrally thereof in radial alignment with corresponding apertures adjacent the rim, tension plates outside the rim plates fastened to the hub and having apertures in substantial registration with the central apertures of the rim plates, the outer edges of the tension plates extending substantially to the inner edges of the apertures in the rim plates adjacent the rim, spring assemblies having cross pins at the inner and outer ends of the springs, said inner cross pins sliding in the central apertures of the rim and tension plates, said outer cross pins sliding in the apertures of the rim plates adjacent the rim and riding on the outer edges of the tension plates.

2. A structure as in claim 1 with front and rear enclosures surrounding the wheel inside the rim.

3. A spring cushioned wheel comprising hub, rim, and tire members, rim plates fastened to the rim and having centrally located multi-sided apertures therein, apertures in the rim plates adjacent the rim and radially opposite the corners of the multi-sided apertures, tension plates outside the rim plates affixed to the hub having central apertures with radial extensions corresponding with and in alignment with the corners of the multi-sided apertures in the rim plates, the outer edges of the tension plates having depressions therein in radial alignment with the corners of the multi-sided apertures in the rim plates, spring assemblies having cross pins at the inner and outer ends of the springs, said inner cross pins positioned in the corners of the multi-sided apertures of the rim plates and in the radial extensions of the tension plates, said outer pins sliding in the apertures of the rim plates adjacent the rim and riding upon the depressions on the outer edges of the tension plates.

4. A wheel structure as in claim 3 with front and rear enclosures surrounding the wheel inside the rim.

5. A spring cushioned wheel comprising hub, rim and tire members, rim plates fastened to the rim, tension plates fastened to the hub, radially disposed tension spring assemblies including members attached to both the inner and outer ends of the springs and contacting surfaces of the rim and tension plates, the outer members mounted to have limited movement substantially radial away from the hub and the inner members mounted to have limited movement substantially radial toward the hub, said arrangement adapted to distribute forces imposed upon the wheel by irregularities of the terrain and the weight of the load carried uniformly over the entire system of spring assemblies.

6. A spring cushioned wheel comprising a hub, a rim, rim plates fastened to the rim, radially disposed tension spring assemblies including members attached to the outer ends of the springs and members attached to the inner ends of the springs, said outer members supported by the rim plates and having a limited radial movement away from the hub and said inner members supported by the rim plates and having a limited radial movement toward the hub, and disc shaped tension plates fastened to the hub having their outer peripheries engaging the outer members of the spring assemblies and their inner peripheries engaging the inner members of the spring assemblies.

AMON C. SALISBURY.
JOHN F. SALISBURY.